(12) United States Patent
Simard et al.

(10) Patent No.: US 12,172,889 B2
(45) Date of Patent: Dec. 24, 2024

(54) PROCESS AND APPARATUS FOR PURIFYING BNNT

(71) Applicant: National Research Council of Canada, Ottawa (CA)

(72) Inventors: Benoit Simard, Orleans (CA); Keith Ingold, Ottawa (CA); Steven Kendrick Walker, Ottawa (CA); Robyn Iannitto, Hamilton (CA); Hyunjin Cho, Ottawa (CA); Yadienka Martinez-Rubi, Orleans (CA); Keun Su Kim, Ottawa (CA); Christopher Kingston, Kanata (CA); Jingwen Guan, Kanata (CA); Stephane Denommee, Ottawa (CA); Dean Ruth, Gatineau (CA); Mark Plunkett, Ottawa (CA)

( * ) Notice: Subject to any disclaimer, the term of this patent is extended or adjusted under 35 U.S.C. 154(b) by 1001 days.

(21) Appl. No.: 17/253,749

(22) PCT Filed: Jul. 11, 2019

(86) PCT No.: PCT/CA2019/050953
§ 371 (c)(1),
(2) Date: Dec. 18, 2020

(87) PCT Pub. No.: WO2020/010458
PCT Pub. Date: Jan. 16, 2020

(65) Prior Publication Data
US 2021/0261414 A1   Aug. 26, 2021

Related U.S. Application Data

(60) Provisional application No. 62/696,377, filed on Jul. 11, 2018.

(51) Int. Cl.
*C01B 21/064* (2006.01)
*C01B 35/14* (2006.01)
*B82Y 40/00* (2011.01)

(52) U.S. Cl.
CPC ........ *C01B 21/0648* (2013.01); *C01B 35/146* (2013.01); *B82Y 40/00* (2013.01);
(Continued)

(58) Field of Classification Search
CPC .......................... C01B 21/0648; C01B 35/146
See application file for complete search history.

(56) References Cited

U.S. PATENT DOCUMENTS 4,089,931 A    5/1978  Sharma et al.
8,206,674 B2   6/2012  Smith et al.
(Continued)

FOREIGN PATENT DOCUMENTS

CA    2877060 A1    10/2014
CN    101708828 A    5/2010
(Continued)

OTHER PUBLICATIONS

International Search Report and Written Opinion dated Sep. 5, 2019 on PCT/CA2019/050953.
Bartl A, et al. Int. J. of Refractory Metals & Hard Materials 14 (1996) 145-157.
Chng Elk, et al. Phys. Chem. Chem. Phys., 2013, 15, 5615.
Kim J et al. J. Mater. Chem. A, 2013, 1, 1014.
Sachdev H, et al. Diamond and Related Materials 9 (2000) 614-619.
Schaffnit C, et al. Surface and Coatings Technology 98 ( 1998) 1262-1266.
(Continued)

*Primary Examiner* — James A Fiorito
(74) *Attorney, Agent, or Firm* — Brunet & Co. Ltd.; Robert Brunet; Hans Koenig

(57) ABSTRACT

Provided is a process and an apparatus for purifying boron nitride nanotube (BNNT) materials. The process involves the use of a halogen gas to remove halogen-reactive impurities from boron nitride nanotube (BNNT) materials in a single step with minimal interactions to produce structurally pristine BNNT. Gaseous byproducts are produced that 5 can be removed without the need for solution phase treatments. Yield efficiencies and purity of recovered BNNT are high compared to the other known methods of purification for BNNT material.

11 Claims, 13 Drawing Sheets

(52) U.S. Cl.
CPC ...... *C01P 2002/84* (2013.01); *C01P 2002/88* (2013.01); *C01P 2004/03* (2013.01); *C01P 2004/13* (2013.01)

(56) References Cited

U.S. PATENT DOCUMENTS

| | | |
|---|---|---|
| 8,734,748 B1 | 5/2014 | Hung et al. |
| 9,862,604 B2 | 1/2018 | Kim et al. |
| 2007/0117484 A1 | 5/2007 | Kmetz |
| 2015/0037448 A1 | 2/2015 | Schultz |
| 2018/0029885 A1 | 2/2018 | Smith et al. |

FOREIGN PATENT DOCUMENTS

| | | |
|---|---|---|
| EP | 1788117 A1 | 5/2007 |
| EP | 2878578 A1 | 6/2015 |
| JP | H0193412 A | 4/1989 |
| JP | 2006306636 A | 11/2006 |
| JP | 2007138298 A | 6/2007 |
| JP | 2015522520 A | 8/2015 |
| JP | 2016521240 A | 7/2016 |
| WO | 02/064868 A1 | 8/2002 |
| WO | 2008126534 A1 | 7/2010 |
| WO | 2015122678 A1 | 3/2017 |
| WO | 2017136574 A1 | 8/2017 |
| WO | 2018/102423 A1 | 6/2018 |

OTHER PUBLICATIONS

Fathalizadeh et al. Nano. Lett. 2014, 14:8, 4881-4886.
Martinez-Rubi Y, et al. J. Phys. Chem. C, 2015, 119, 26605.
Marincel DM, et al. Chem. Mat., 31, 1520-1527 (2019).
Adnan M, et al. Nano Lett. 2018, 18, 1615.
Tiano AL, et al. "Boron Nitride Nanotube: synthesis and Applications", Proc. SPIE vol. 9060 (2014) 90606.
Kim KS, et al. Semicond. Sci. Technol. 2017, 32, 013003.
Kim D, et al. Nanoscale Res. Lett. 2017, 12, 94.
Zhi CY, et al. Chemistry—An Asian Journal 2009, 4(10), 1536.
Chen H et al. Chem. Phys. Lett., 2006, 425, 315.
Martinez-Rubi Y, et al. ACS Appl Nano Mater 2019, 2, 2054.
Choi J-H, et al. Mat. Res. Bull., 48 (2013) 1197-1203.
Office action dated Jun. 22, 2023 on Japanese application 2021-500713.
Lin X-S, et al. Iran. J. Chem. Chem. Eng. (2014) 33(1), 29-36.
Extended European Search Report dated Apr. 11, 2022 on European application 19834036.6.
NanoIntegris Raymor marketing literature. 2017.
Vazquez H, et al. Purification of Boron Nitride Nanotubes. 2014 Transfer-to-Excellence Research Experiences for Undergraduates Program poster presentation.
Zimmerman JL, et al. Chem. Mater. 2000, 12, 1361-1366.
Cho H, et al. Chem. Mater. 2020, 32, 3911-3921.
Office action dated May 30, 2024 on Korean application 10-2021-7004113.

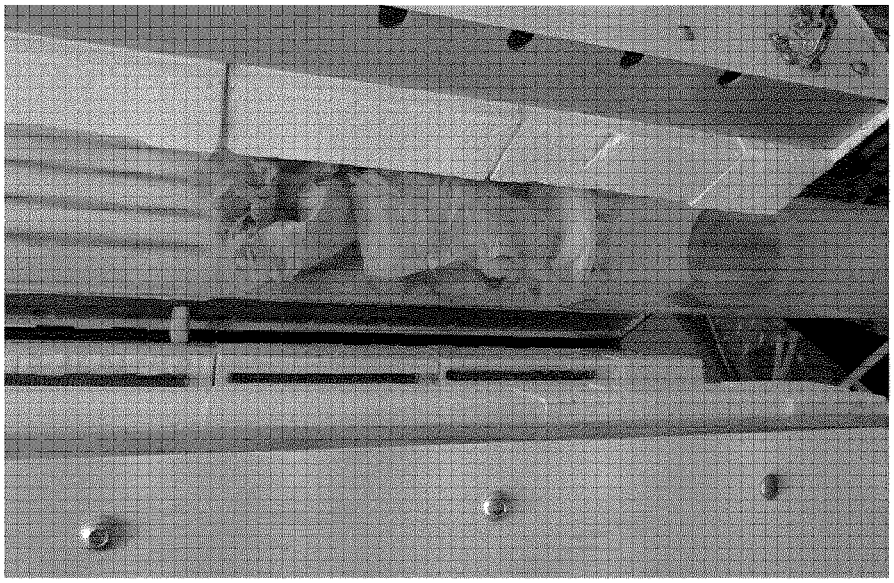
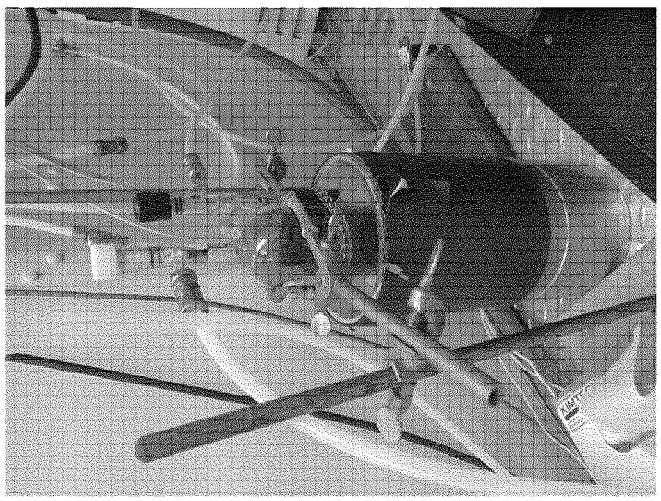
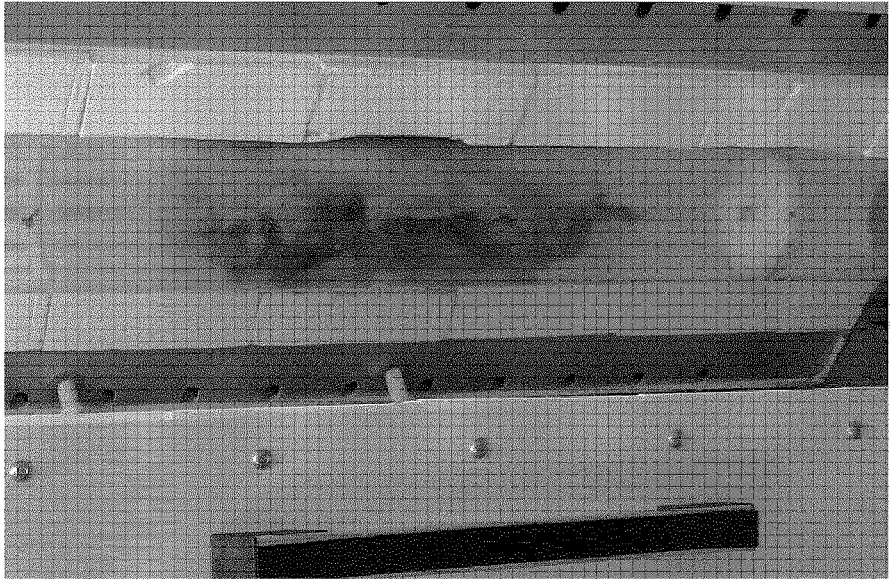
Fig. 10

| Purified Temperature (°C) | $S_{BET}$ (average, $m^2/g$) | rra-P3HT quality index $[Q_i = I(A_{1-0})/I_{420}]$ |
|---|---|---|
| As-produced BNNTs | 62.00 | 0.891 |
| 750 | 117.70 | 1.314 |
| 850 | 147.05 | 1.394 |
| 950 | 184.80 | 1.974 |
| 1050 | 196.35 | 2.048 |

Fig. 13

PROCESS AND APPARATUS FOR PURIFYING BNNT

CROSS-REFERENCE TO RELATED APPLICATIONS

This application is a national entry of PCT/CA2019/050953 filed Jul. 11, 2019, which claims the benefit of U.S. Provisional Patent Application Ser. No. 62/696,377 filed Jul. 11, 2018, the entire contents of both of which are herein incorporated by reference.

FIELD

This application relates to boron nitride nanotubes (BNNT), in particular to a process and system for purifying boron nitride nanotubes.

BACKGROUND

Scalable methods to manufacture boron nitride nanotubes (BNNT), such as those summarized in the review article by K. S. Kim et al.,[1] produce materials that contain various impurities such as elementary boron, unused or slightly processed feedstocks as well as some catalyst particles such as metal particles. The most promising manufacturing methods from a commercial point of view are high temperature methods because they do not require the use of metal catalysts, they use simple feedstocks such as elementary boron, h-BN (h=hexagonal) and simple gases, and the feedstocks are vaporized and/or decomposed before the critical density for BNNT growth is reached. In high temperature processes, such as those disclosed in U.S. Pat. No. 9,862,604 B2 or U.S. Pat. No. 8,206,674 B2, or in processes disclosed in US 2015/037448 or US 2018/0029885, the BNNT content in these materials is no more than 55% by weight. The BNNT produced by these methods (i.e. as-produced material or ap-material) are highly crystalline, possess few walls, generally fewer than 10, and have aspect ratios (length/diameter) greater than 500. The impurities include elemental boron and various caged derivatives, various boron containing polymers, 2-dimensional (2-D) amorphous and crystalline boron nitride compounds. Depending on the apparatus used, the material can be contaminated with carbon containing compounds. Removing these impurities is essential for the utilization of BNNT in various applications. For instance, in the area of composite materials, if transparency or mechanical property enhancement is sought, the removal of impurities must be as complete as possible. In medical applications, the material must be as pure as possible.

Several methods have been reported to purify BNNT materials. These can be classified into four groups: liquid phase treatments, gas-phase treatments, combinations thereof and solid-liquid phase treatments. Liquid phase treatments include acid oxidation,[2] peroxide water treatment,[3] and superacid extraction[4]. The drawbacks of these methods are: limited effectiveness, damage to the BNNTs, limited scalability and cost. Gas phase treatments include water vapor treatments at high temperature[5] such as those proposed in WO 2017/136574 and reported in the scientific literature (D. M. Marincel, M. Adnan, J. Ma, E. Amram Bengio, M. A. Trafford, O. Kleinerman, D. V. Kosynkin, S-H Chu, C. Park, S. J. A. Hocker, C. C. Fay, S. Arepalli, A. A. Marti, Y. Talmon and M. Pasquali, Chem. Mat., 31, 1520-1527 (2019). There, the reagent is water which serves as an oxygen source to transform elemental boron or terminated B edges into borates and a hydrogen source to transform borates into hydrogen borates which are sublimated at temperatures above 600° C. The main drawbacks of this method are: it is time consuming due to low transformation rates and it offers low yields due to chemical attacks on BNNT. Combinations of gas and liquid phase treatments include air oxidation at elevated temperatures[6]. There, the first step is gas phase oxidation using molecular oxygen as a reagent that transforms elementary boron and terminated boron edges into boron oxides. The second step is a liquid phase step, usually water, but methanol is also used, to remove the created boron oxides. This step removes boron oxides from elementary boron quite effectively, but it is not efficient for terminated boron oxides and other types of impurities. The main drawbacks of this method are: the temperature at which air oxidation is carried out is also the temperature at which other chemistry with the BNNT takes place, and the boron oxide that is created is in the liquid state and therefore it coats the BNNT. This boron oxide coating is hard to remove by solution phase treatments without solubilizing the BNNT because the boron oxide acts as a surfactant.

A combination of solid-liquid phase treatment is disclosed in U.S. Pat. No. 8,734,748. A liquid or near liquid state ferric chloride salt, at temperatures generally between 250° C. and 350° C., is used to penetrate and wet the internal surfaces of BNNT to dissolve impurities to diffuse to the external surfaces of the nanomaterial and be washed away. For the process to work effectively conditions which cause the salt to decompose are to be avoided. The use of other agents such as HCl at room temperature and heating in air to 700° C. complements the application of the ferric chloride salt to remove impurities which cannot be dissolved using the molten salt alone. The main drawbacks of this method are: the lack of scalability, the use of molten metallic salts and multi-step washing cycles. Not known is the yield but because of the multi-step washing cycles the yield is presumably low.

There remains a need for a simple, low cost and scalable method of purifying BNNT materials. As used herein, purification means the removal of impurities. Purification may also include an improvement in the crystallinity of the BNNT material.

SUMMARY

In one aspect, there is provided a process for purifying boron nitride nanotubes, the process comprising: contacting a solid boron nitride nanotube material containing boron nitride nanotubes and impurities with a halogen gas at a temperature of 380° C. or greater, the impurities reacting with the halogen gas to produce gaseous halogen-containing byproducts; and, removing the gaseous halogen-containing byproducts and unreacted halogen gas from the solid boron nitride nanotube material to produce purified boron nitride nanotubes.

In another aspect, there is provided a system for purifying boron nitride nanotubes, the system comprising: a source of halogen gas; a furnace having a sample chamber for containing solid boron nitride nanotube material while providing gas flow passages there through, a gas inlet into one end or wall of the sample chamber, a gas outlet from a second end or wall of the sample chamber and a heater for heating at least the sample chamber to a temperature of 380° C. or greater; a gas flow controller between the source of halogen gas and the inlet of the sample chamber for controlling flow of the halogen gas into the sample chamber, the halogen gas flowing substantially through the solid boron nitride nanotube material in the sample chamber; and a scrubber fluidly connected to the outlet of the sample chamber, configured to receive the halogen gas flowing through the gas outlet of the sample chamber and sequester a flow of gaseous halogen-containing compounds exiting the outlet of the sample chamber.

It is to be understood, that as used herein, the terms "connect" and "connected" refer to any direct or indirect physical association between elements or features of the system (e.g. an apparatus) of the present disclosure. Accordingly, these terms may be understood to denote elements or features that are partly or completely contained within one another, attached, coupled, disposed on, joined together, etc., even if there are other elements or features intervening between the elements or features described as being connected.

The gas phase process of the present invention is a fast, efficient and scalable process that is capable of removing impurities from BNNT materials and results in gas phase species that are easily removed without need for solution phase treatment. Purity levels of the purified BNNT can be controlled by adjusting the halogen gases used, the use of additional additives (e.g. HCl), the temperature and the application time at which the process is conducted. The process is based on the difference in reaction rates between a halogen, such as molecular chlorine, with impurities and pristine BNNT. In the temperature range of 380° C.-1250° C., molecular chlorine reacts the fastest with elemental boron and boron vacancies. Terminated edges, such as those in BN and BNH derivatives, including defective BNNT surfaces, react with molecular chlorine gas more slowly than free elemental boron, but faster than structurally pristine BNNT surfaces. Hence, by adjusting the temperature and exposure time, it is possible to remove impurities preferentially over pristine BNNT. The process can further be adapted to perform chemistry on the purified BNNT.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, specific embodiments will now be described in detail by way of example, with reference to the accompanying drawings, in which:

FIG. 5A shows purified BNNT material that was chlorine treated at 750° C. for 30 minutes, FIG. 5B shows purified BNNT material that was chlorine treated at 850° C. for 30 minutes, FIG. 5C shows purified BNNT material that was chlorine treated at 950° C. for 30 minutes, FIG. 5D shows purified BNNT material that was chlorine treated at 1050° C. for 30 minutes, and FIG. 5E shows purified BNNT material that was chlorine treated at 1050° C. for 120 minutes.

FIG. 10 illustrates a part of a system according to the present disclosure and the colorimetric changes to the BNNT material before and after purification using bromine (Br) gas.

FIG. 11B consists of photo images of the purified BNNT material suspension (at 750° C. to 1050° C.) before and after removing the residual (free) rra-P3HT.

FIG. 12A illustrates the UV-vis absorption spectrum and background profile for AP-BNNT material shown in FIG. 11. FIG. 12B illustrates the UV-vis absorption spectrum extracted from removing the background profile for the AP-BNNT material. FIG. 12C illustrates UV-vis spectra and background profiles for the BNNT material purified at various temperatures as shown in FIG. 11. FIG. 12D illustrates UV-vis absorption spectra extracted from removing the background profiles for the BNNTs purified at various temperatures.

FIG. 13 is a table illustrating the comparisons of BET surface area ($S_{BET}$) and rra-P3HT Quality Index for the AP-BNNT material and BNNT material purified at various temperatures, as shown in FIG. 11.

DETAILED DESCRIPTION

Figure 1:
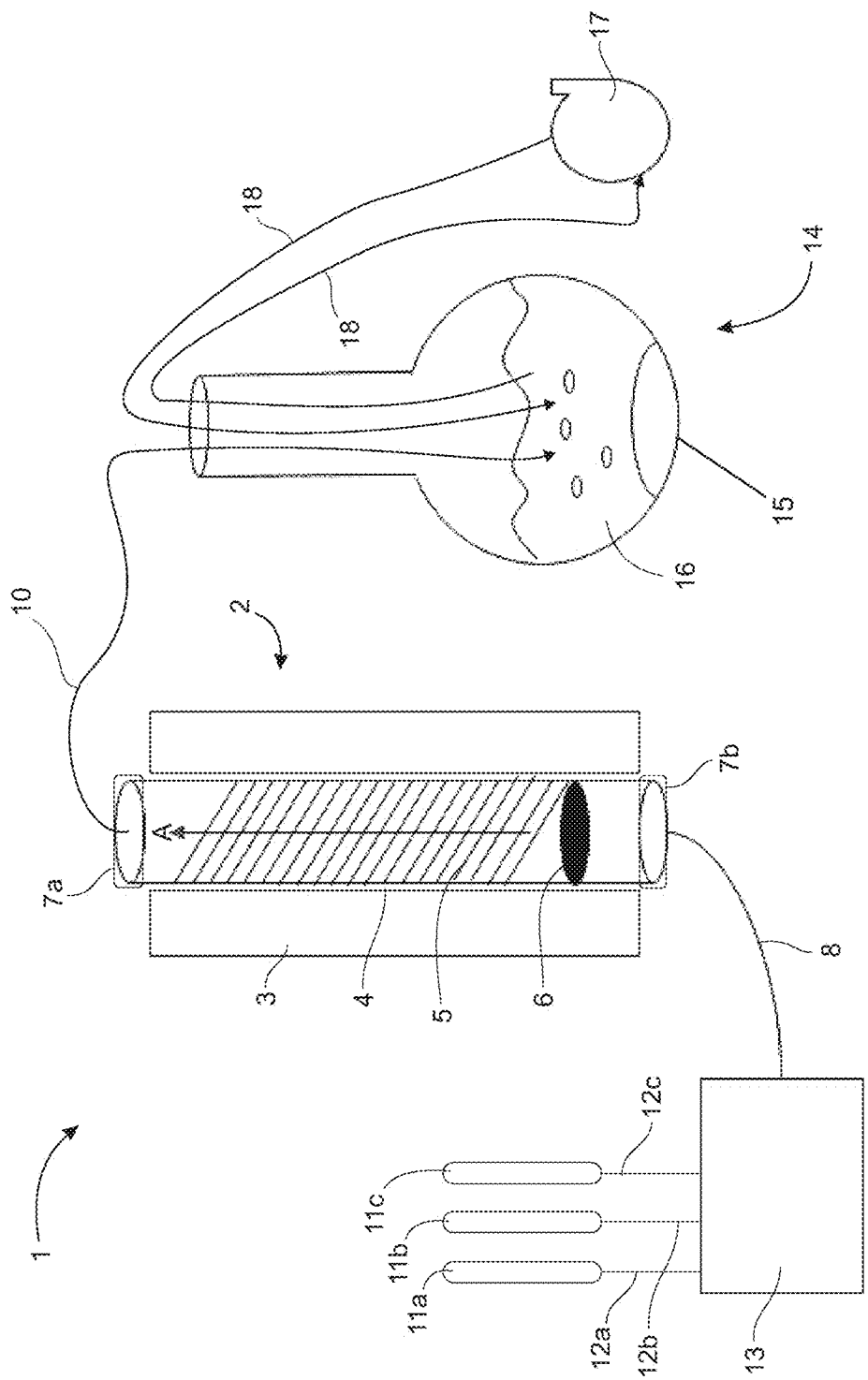
FIG. 1 is a schematic diagram of a system (e.g. an apparatus) for purifying boron nitride nanotubes.

There are several impurities that can be identified in BNNT material, each affecting its quality for different applications. In developing a more efficient process for purifying such nanomaterials consideration was given to the ease of processing while maintaining the integrity of BNNT to minimize losses of useful material. Compared to boron nitride, h-BN and other impurities, BNNT structures are believed to be not as chemically stable and are considered less able to withstand the harsh conditions that could be applied to remove such impurities.

It has now been found, however, that a halogen gas may be used, over a range of temperatures, to remove halogen-reactive impurities from boron nitride nanotube (BNNT) materials in a single step, with the halogen reacting minimally with structurally pristine BNNT. Gaseous byproducts are produced that can be readily removed from the purified BNNT without the need for extra steps such as solution phase treatments. Yield efficiencies and purity of recovered BNNT are high compared to prior art methods.

For the purposes of the present disclosure the quality of recovered BNNT material following the purification process disclosed herein can be assessed according to two main parameters, its purity and its defect density. The purity of a sample of BNNT material is defined as the fraction of nanotubes in the sample. The defect density is defined as the abundance of structural defects such as B or N vacancies or others structural defects on the nanotube walls (which impacts the integrity of BNNT crystallinity). The quality of BNNT material can be determined using rra-P3HT hybridization with BNNT in the spectroscopic and colorimetric methods of Martinez Rubi et al. 2019[7], and Martinez Rubi et al. 2015[8], which references are herein incorporated by reference in their entirety The impurities to be removed from the solid boron nitride nanotube material are halogen-reactive. The impurities may be boron-containing impurities (e.g. elemental boron (B), amorphous boron nitride (BN), hexagonal boron nitride (h-BN), BNH derivatives, etc.), carbon-containing compounds, residual feedstocks, metal catalysts or other impurities. Preferably, the solid boron nitride nanotube material is a material produced in a catalyst-free process so that no or few metal particles are present in the boron nitride nanotube material. The process is also applicable when metal catalysts are present, but depending on the metal an extra step may be required to remove any non-volatile metal halides that are formed by the reaction with the halogen.

The halogen gas may be gaseous fluorine ($F_2$), chlorine ($Cl_2$), bromine ($Br_2$), iodine ($I_2$) or any mixture thereof. In an embodiment, the halogen gas is chlorine, bromine or a mixture thereof. In another embodiment, the halogen gas is chlorine. In a further embodiment the halogen gas is bromine.

When using a mixture of halogen gases, the relative proportions of gases may remain the same or be varied during the processing of raw or partially purified BNNT material. In another embodiment, each halogen gas may be applied sequentially without mixing gases during the processing of the BNNT material, i.e. to leverage optimal temperature processing ranges for different halogen gases in the sample chamber/furnace subsystem—see FIGS. 1 and 8).

The halogen gas reacts with the impurities in the boron nitride nanotube material to produce gaseous halogen-containing byproducts as well as other gaseous byproducts that spontaneously separate from the solid boron nitride nanotube material, or that can be separated by the application of a negative pressure or under a positive pressure of flowing gas. The flowing gas may be the halogen gas or an inert carrier gas (e.g. helium, argon, nitrogen and the like) or a mixture thereof. In the case of boron-containing impurities, boron in the impurities is converted to gaseous boron halide, for example boron trihalide, or more complex volatile halides. Nitrogen in amorphous BN, h-BN or BNH impurities may be converted to nitrogen gas or contained in the volatile halides. Hydrogen in BNH impurities may be converted to hydrogen gas or gaseous hydrogen halide. Oxygen in dangling bonds terminating impurities may be converted in gaseous halide oxides of various kinds, NOx or in oxoacids when combined with hydrogen atoms. Because the byproducts are gaseous at the temperature of the process, the byproducts can readily escape from the solid boron nitride nanotube material with the flowing gas or mixture thereof without leaving a residue or requiring further treatment to be removed. For example, the boiling points at atmospheric pressure for $BF_3$, $BCl_3$, $BBr_3$ and $BI_3$ are −100° C., 12.6° C., 91.3° C. and 210° C., respectively, all of which are considerably lower than 380° C.

Additional purification additives may be optionally used for the more selective or complete removal of impurities, such as h-BN. In one embodiment additives are used to pre-process BNNT material containing impurities (AP-BNNT material and/or partially purified BNNT material). In another embodiment, additives are used together with the halogen gas to purify BNNT material containing impurities. In still another embodiment, additives are used after the processing of BNNT material containing impurities with the halogen gas.

For example, HCl gas can be used in addition to a halogen gas for the removal (etching) of h-BN impurities[9] from BNNT material over a similar temperature range as provided for the process of the present disclosure. In one embodiment, HCl gas is mixed with chlorine gas at temperatures in the range of about 850° C. to about 1250° C. to remove h-BN impurities from BNNT materials. With reference to FIG. 1 an additional gas cylinder line for HCl gas could be added where the lines are provided for the halogen, argon and nitrogen gases (see Example 1). The mass flow controller can adjust the various proportions of gases as desired to achieve the purification of BNNT material. Up to 50% HCl could be used in conjunction with chlorine, argon or other gases.

In one embodiment, the amount of HCl gas used is maintained at a consistent proportion relative to amount of halogen gas used. In another embodiment, the proportion of HCl gas used is changed relative to the amount of halogen gas used in different processing stages, e.g. as may be defined by the temperature applied for a given processing stage.

In still another embodiment the amount of HCl used is increased incrementally following initial processing of BNNT material containing impurities to remove elemental boron. In a related embodiment, HCl gas is added following processing of BNNT material containing impurities at 500° C. In another related embodiment, HCl gas is added following the processing of BNNT material containing impurities at 750° C.

Gaseous halogen-containing byproducts may be sequestered downstream of the purification process with a gas scrubber. The gas scrubber may comprise any medium that can absorb the gaseous halogen-containing byproducts and/or react with the gaseous halogen-containing byproducts to form products that can be absorbed. For example, the gas scrubber may comprise an aqueous solution of a base. The base may be any suitable base, for example an alkali metal hydroxide, an alkaline-earth metal hydroxide, an organic base, any mixture thereof or the like. In an embodiment an alkali metal hydroxide, for example sodium hydroxide, potassium hydroxide or mixtures thereof is employed.

The temperature at which the process is conducted is 380° C. or greater. In an embodiment the temperature is 1250° C. or less. In another embodiment the temperature is 950° C. or less. When chlorine gas is used, the temperature is preferably between about 450° C. and about 1250° C. A particularly suitable temperature when chlorine gas is used is in a range of 600° C. to 1250° C., including subranges within this range, for example 600° C. to 1050° C., or 850° C. to 1250° C. When fluorine gas is used, the temperature is preferably 750° C. or less. A particularly suitable temperature when fluorine gas is used is in a range of 500° C. to 700° C., for example 550° C. to 650° C. When bromine gas is used, the temperature is preferably 1250° C. or less. A particularly suitable temperature when bromine gas is used is in a range of 700° C. to 1250° C., for example 950° C. to 1250° C. It is advantageous that the temperature at which the process can successfully remove impurities, including boron-containing impurities, from the solid boron nitride nanotube material is less than the temperature at which the structurally pristine BNNT starts reacting with the halogen gas. In this way, impurities may be removed from the boron nitride nanotube material without also causing loss of BNNT through functionalization of the BNNT. In this regard, it is noted that as used herein, the term "about" refers to an approximately +/−10% variation from a given value. It is to be understood that such a variation is always included in any given value provided herein, whether or not it is specifically referred to, and unless stated otherwise.

The halogen gas may be at any suitable pressure. For convenience, the halogen gas may be at atmospheric pressure, although lower or higher pressures may be used. Higher pressures of halogen gas may increase reaction rate.

The halogen gas should be in contact with the solid boron nitride nanotube material for a sufficient time to extract the impurities inside the boron nitride nanotube material. The contact time may be from 0.1 to 30 minutes per gram, for example 1 to 20 minutes per gram. In some situations, the particle size of the solid boron nitride nanotube material may be reduced prior to purification to enhance the ability of the halogen gas to extract impurities. Particle size may be reduced by cutting, pulverizing, grinding or the like.

Exposure to halogen is preferably done under dry conditions. Under dry conditions, water is substantially excluded. Water may be removed by any suitable method, for example by drying the boron nitride nanotube material at an elevated temperature (e.g. at 300° C.) preferably under a flow of inert gas. Water may be minimized so that the halogen gas is not solubilized in water. Solubilization of the halogen gas in water reduces the availability of free halogen molecules and leads to lower yields and to the production of unwanted gaseous byproducts and/or to destruction or chemical modifications of the BNNT. Typical drying times are 300° C. under 500 sccm of Ar, in the range of 5 to 100 minutes per gram, but other drying conditions may be used.

The process disclosed herein does not preclude the use of other reactive gases like oxygen, ammonia and water to refine the process. However, mixing other reactive gases with halogens must be carefully assessed. In one embodiment, other reactive gases can be applied sequentially. For example, after exposure to halogen gas for a prescribed time, the halogen flow may be stopped, the system purged and other reactive gases may be introduced for a prescribed time. The cycle can be repeated as needed.

Yields of purified BNNT may be 50 wt % or more, or even 60 wt % or more, relative to the starting weight of the non-purified boron nitride nanotube material. Yields in a range of 50-80 wt %, for example 60-80 wt %, are typical for many boron nitride nanotube materials. The yield will vary depending on the quality of the as-produced boron nitride nanotube material and the temperature and duration of the purification process. Purity levels of the purified BNNT may be on the order of 75% or higher, 80% or higher, 85% or higher, or even 90% or higher.

EXAMPLES

Example 1—Purification System

A schematic drawing of a system configured as an apparatus 1 for purifying as-produced boron nitride nanotube materials (AP-BNNT) is shown in FIG. 1. The apparatus 1 comprises a tube furnace 2, the tube furnace 2 comprising a 3-stage oven 3 and a vertically-oriented quartz tube 4 situated in the oven 3. The 3-stage oven 3 can provide for different temperature zones along the quartz tube 4, if desired, so that top, middle and bottom sections of the quartz tube 4 can be differentially heated. BNNT material 5 to be purified can be placed in the quartz tube 4 above a porous frit 6; the porous frit 6 preventing the BNNT material 5 from falling out of the quartz tube 4 while permitting the passage of gases through the frit 6. Purification of the BNNT material 5 occurs in the quartz tube 4 where the halogen gas reacts with impurities to produce gaseous byproducts.

The top and bottom of the quartz tube 4 may be sealed with Teflon™ flanges 7a, 7b, respectively, which are configured to seal receiving gas lines. The Teflon™ flanges 7a, 7b may be equipped with valves. The bottom flange 7b is sealingly fitted with an inlet gas line 8 to permit gases under pressure to flow into the quartz tube 4. A gas flow stream A in the quartz tube 4 flows vertically from bottom to top through the BNNT material 5. The exhaust gases flow out of the quartz tube 4 through the top into an exhaust gas hose 10 sealingly fitted with the top flange 7a.

Gases to be used in the apparatus are stored under pressure in gas cylinders 11. As shown in FIG. 1, separate gas cylinders 11a, 11b, and 11c are provided for halogen gas, argon gas and nitrogen gas, respectively, for example. Additional lines can be added if needed, for example, to accommodate the application of other gases, such as HCl gas. Gases from the gas cylinders 11a, 11b, and 11c flow through separate gas feed lines 12a, 12b, and 12c, respectively, to separate inlet ports of a multi-port mass flow controller (MFC) 13. The inlet gas line 8 receives feed gases from an outlet port of the MFC 13. The MFC 13 can independently control the flow rate of the feed gases into the inlet gas line 8.

The exhaust gas hose 10 receives the exhaust gases from the quartz tube 4 and delivers the exhaust gases to a gas scrubber 14. The gas scrubber comprises a vessel 15 containing a scrubbing liquid 16, for example an aqueous solution of a base (e.g. an aqueous alkali solution). The exhaust gases are bubbled directly into the scrubbing liquid 16 where the exhaust gases are neutralized and/or dissolved. The gas scrubber 14 further comprises a recirculating pump 17 that recirculates the scrubbing liquid 16 through recirculating lines 18 to ensure mixing of the scrubbing liquid 16 to provide more efficient scrubbing of the exhaust gases.

Figure 8:
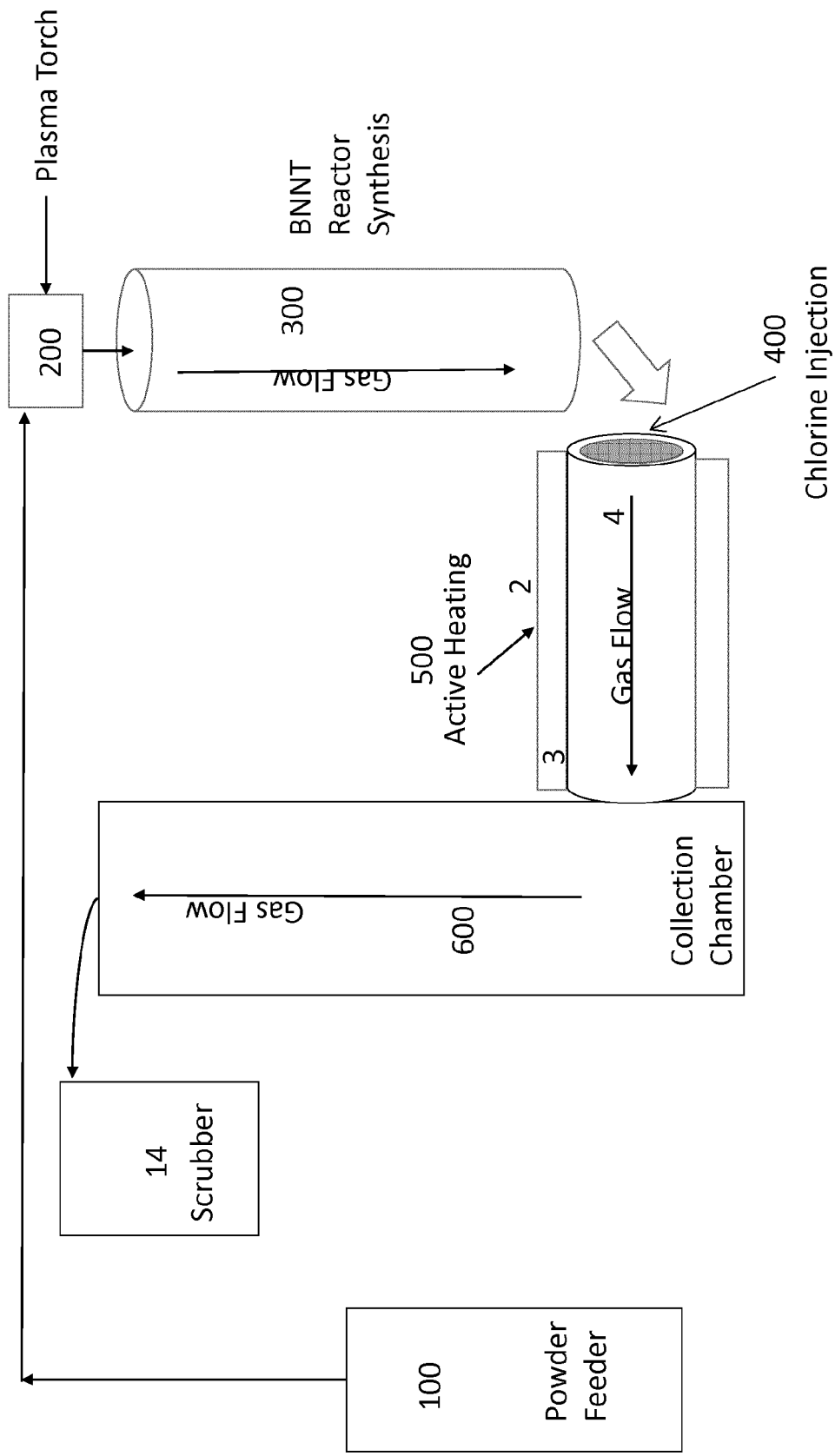
FIG. 8 is a schematic representation of a system according to the present disclosure integrated with a system for making BNNT material to provide for the continuous processing of BNNT and yield purified nanomaterial to a desired quality.

An alternative embodiment of a system for purifying BNNT according to the present disclosure is shown in FIG. 8. FIG. 8. Illustrates a schematic of a fully integrated manufacturing process for making, in situ, high quality BNNT applying the system and process of the present disclosure. The system/apparatus illustrated in FIG. 1 is integrated in a manufacturing reactor for BNNT and is suitable for high temperature processes, such as those disclosed in U.S. Pat. No. 9,862,604 B2 or U.S. Pat. No. 8,206,674 B2, or in processes disclosed in US 2015/037448 or US 2018/0029885, which disclosures are incorporated herein by reference in their entirety.

100 is a feedstock provider. 200 is plasma torch to vaporize the feedstock. 300 is the BNNT growth reactor. 400 represents the chlorine injection/feed step of the process put into effect using an annular chlorine injector, or other gas feed system analogous to that shown in FIG. 1. System features 2, 3, 4 in FIG. 1 can be inserted after the plasma reactor where the BNNT are synthesized and before the collector zone where the BNNT are collected. The annular chlorine injector is integrated in the quartz tube. The impurities that are generated during the synthesis process are immediately transformed into gaseous species and flown to the scrubber for neutralization, whereas the BNNT that are generated pass through the chlorinator section without modification and are collected by a filtering unit (not shown). More particularly, 2 is a heating source like a tube furnace (see also FIG. 1 for greater detail) to put into effect the active heating step 500. 600 is a collection chamber for the BNNT. 14 is a scrubber used to neutralize corrosive gases.

An important consideration in the design of various embodiments of the system of the present disclosure is how to ensure that the halogen gas and other gases flow through the raw BNNT material evenly to ensure all material is purified to the same extent or degree. One skilled in the art will appreciate that one factor in this regard is the density of as produced or partially processed BNNT material in the sample chamber, which in some cases may preferentially dictate an upright versus a horizontally oriented sample chamber.

Example 2—Purification Process: Elementary Boron Removal

The apparatus as described in Example 1 was used to purify as-produced boron nitride nanotube materials (AP-BNNT) in accordance with the following process.

AP-BNNT is weighed, then degassed in an oven for 24 hours at 150° C. under house air to dry the material, and then weighed again as soon as the material is taken out of the oven. The dried AP-BNNT is shredded into sheets using tweezers to pull apart the sheets and the shredded material is transferred into the quartz tube, above the porous frit. Prior to transfer, the quartz tube has been heated to 105° C. to lessen the electrostatic properties of the material upon insertion.

The gas scrubber is provided with 15 L of water and an amount of sodium hydroxide equal to 10 times the mass of the dried AP-BNNT. A Teflon™ top flange is secured to the top of the quartz tube and the top of the quartz tube is connected to the gas scrubber by the exhaust hose. A Teflon™ bottom flange is secured to the bottom of the quartz tube, and the bottom of the quartz tube is connected to the multi-port mass flow controller by the inlet gas line. The flanges may be equipped with valves. The mass flow controller is connected to a source of dry argon gas, a source of dry nitrogen gas and a source of chlorine gas through separate ports and gas feed lines. The quartz tube is filled with argon at a flowrate of 500 sccm. After 10 minutes the temperature of the quartz tube is raised to 300° C. After another 15 min at 300° C., the argon flow rate is lowered to 40 sccm and argon is allowed to flow overnight.

The next day, the apparatus is checked to ensure that gas lines and flanges are sealed by detaching the exhaust hose from the scrubber and sealing the end of the exhaust hose, allowing argon gas pressure in the apparatus to rise to 800 Torr, then stopping the flow of argon gas and watching to ensure that the gas pressure in the system does not decrease over a period of five minutes. If no leaks are evident, the exhaust hose is reattached to the scrubber.

A flow of argon gas at 500 sccm is continued for five minutes to purge the system with the temperature of the quartz tube still at 300° C. The argon flow is then stopped and the quartz tube is filled with chlorine gas at a flowrate of 1000 sccm. Fill time is typically 7 minutes. The recirculation pump of the gas scrubber is then turned on. Once the quartz tube has finished filling with chlorine gas, the flowrate of chlorine gas is changed to 50 sccm and chlorine gas is allowed to flow for 20 minutes. After the 20 minutes, the chlorine flowrate is changed to 1000 sccm and a flow of argon gas is started at a rate of 50 sccm. After another 20 minutes, the temperature of the quartz tube is raised to 750° C. The Teflon™ flange should be cooled, for example by air blowers, to prevent warping from the heat.

During the purification process, the color of the gas in the quartz tube changes from yellow-green (chlorine) to white/colorless ($BCl_3$). The amount of time required to complete the purification is usually on the order of 1.2 minutes per gram of AP-BNNT charged into the quartz tube. Purification is nearing completion when yellow gas begins to reappear at the top of the quartz tube. At this point, the flow rate of chlorine gas is changed to 50 sccm. On completion of purification, the color of the purified BNNT should be beige/white and uniform throughout the quartz tube. If further purification is necessary after inspection of the purified product, the chlorine gas flow rate is raised to 500 sccm and the argon gas flow rate is set at 50 sccm until the purification is complete, typically another 5-15 minutes.

After purification is complete, the chlorine gas is purged from the system and the purified product is annealed. This is accomplished by stopping the chlorine gas flow and providing a flow of nitrogen gas at a flowrate of 500 sccm, where 250 sccm of nitrogen gas is provided through the chlorine gas feed line to purge the multi-port flow controller and 250 sccm is provided through the nitrogen port of the multi-flow controller. After 15 min of purging, the recirculating pump of the gas scrubber is switched off and 500 sccm of argon gas is allowed to flow through the system for 45 min.

After the 45 min, the temperature of the quartz tube is reduced to 25° C. while holding the flowrate of argon at 500 sccm. When the temperature of the midsection of the quartz tube reaches 500° C. during the cooling period, the oven is opened. When the temperature of the midsection of the quartz tube drops to below 75° C., the argon flowrate is reduced to 50 sccm. Once the system is fully cooled, the exhaust hose is disconnected from the gas scrubber and the top flange is removed. The bottom flange is then removed and the purified BNNT is removed from the quartz tube. The quartz tube is cleaned with water followed by methanol.

The purification process was conducted on various as-produced BNNT materials to determine the extent of BNNT recovery. All as-produced BNNT materials were produced according to the process described in U.S. Pat. No. 9,862,604 issued Jan. 9, 2018, the entire contents of which is herein incorporated by reference. The results from replicate purification experiments, carried out using laminated flexible cloth-like BNNT materials collected from the surfaces of filters as the as-produced BNNT material, are provided in Table 1. All experiments have been carried out at 750° C. as described above.

TABLE 1

| Experiment No. | Mass in (g) | Mass out (g) | Yield (%) |
|---|---|---|---|
| 1 | 11.8 | 8.80 | 74.6 |
| 2 | 7.7 | 4.65 | 60.4 |
| 3 | 7.6 | 4.95 | 65.1 |
| 4 | 6.4 | 4.50 | 70.3 |
| 5 | 8.75 | 7.30 | 83.4 |
| 6 | 10.35 | 7.75 | 74.9 |
| 7 | 8.55 | 6.65 | 77.8 |
| 8 | 8.8 | 7.65 | 86.9 |
| 9 | 8.8 | 7.00 | 79.5 |
| 10 | 9.8 | 6.55 | 66.8 |

TABLE 1-continued

| Experiment No. | Mass in (g) | Mass out (g) | Yield (%) |
|---|---|---|---|
| 11 | 8.8 | 7.20 | 81.8 |
| 12 | 8.8 | 6.55 | 74.4 |
| 13 | 9.2 | 7.20 | 78.3 |
| 14 | 9.6 | 8.00 | 83.3 |
| 15 | 9.6 | 6.20 | 64.6 |

Figure 2:
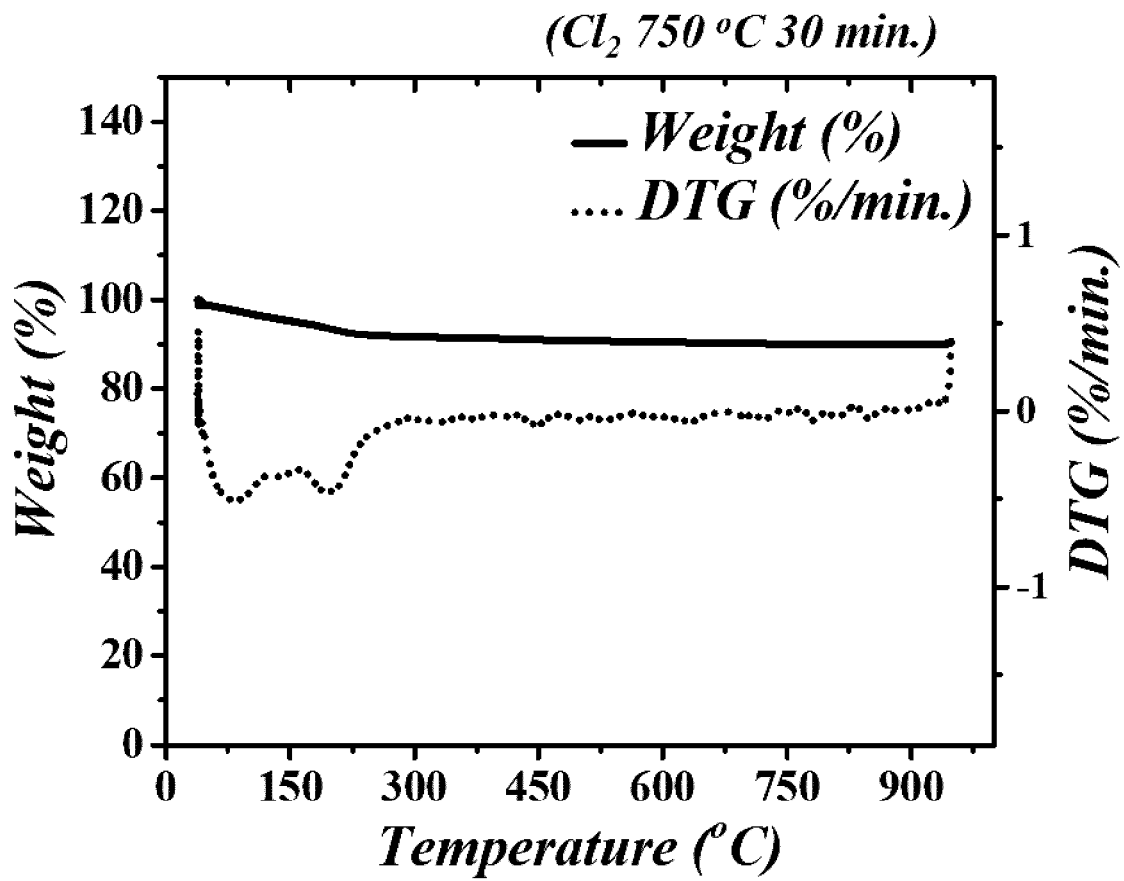
FIG. 2 is a graph showing the results of thermogravimetric analysis of purified BNNT material after chlorine treatment at 750° C. for 30 minutes.

As seen in Table 1, the purification process provides BNNT recoveries between 60 wt % and 85 wt %, based on the difference in mass before purification and after purification. For many experiments, the recovery was over 70 wt %. Thermogravimetric analysis (TGA) of the purified materials indicates that the amount of residual free boron is less than 0.1 wt %. A typical TGA is shown in FIG. 2. There is no mass increase in the temperature range of 100-900° C., indicating the absence of free boron. Gravimetric analyses further indicate that the amount of h-BN derivatives in the as-produced BNNT and purified BNNT are similar, indicating that the process conducted under the above conditions is effective at removing elementary boron species and some BNH polymeric species, but not residual h-BN derivatives. The following protocol was strictly followed for the gravimetric analyses. Two grams of BNNT material (as produced or purified) was placed in a 1 liter bottle and 1 liter of boiling water was added. The bottle was then placed in a bath sonicator where it was subjected to 15 minutes of sonication. Afterwards the mixture was filtered through a stainless steel mesh with 20 micrometer openings. The process was repeated 4 times, after which the solution remained transparent after sonication. The filtrand was then dried and weighed and compared to the initial mass of material. The mass loss correlates directly to the amount of h-BN derivative present in the starting material.

Example 3—Purification Process: h-BN Removal and Improvement in Crystallinity

Figure 3:
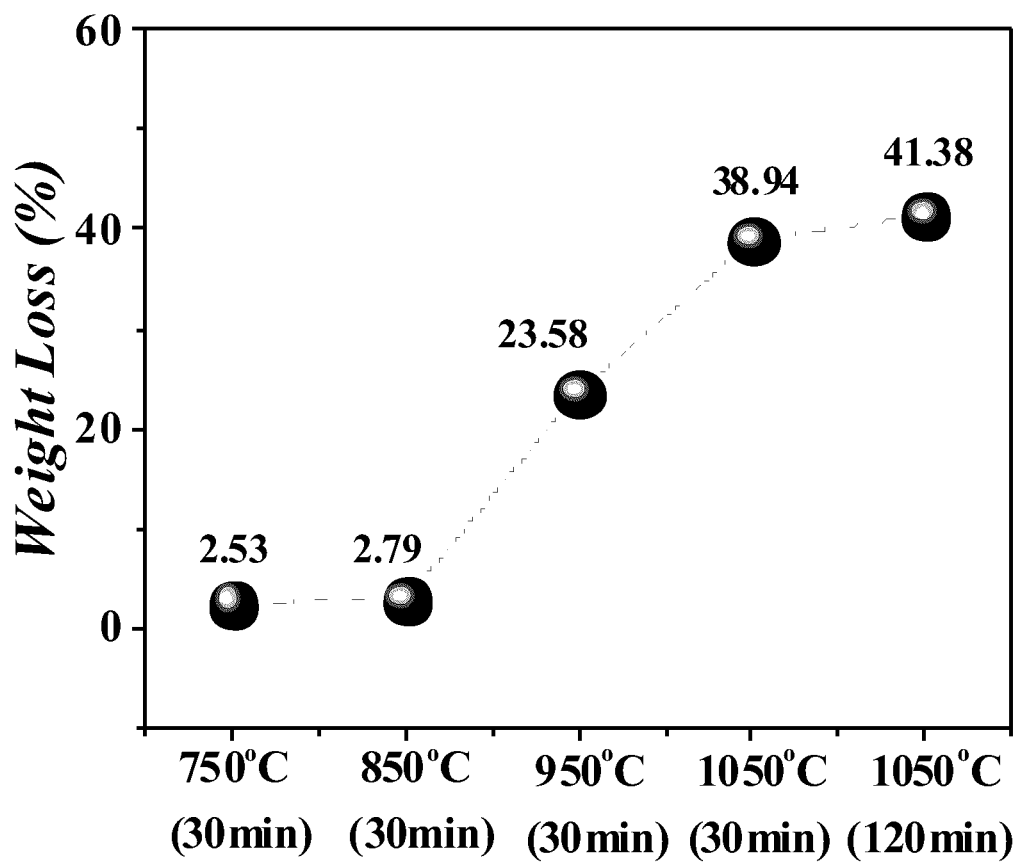
FIG. 3 is a graph showing the mass loss after chlorine treatment at various temperatures and durations.
Figure 4:
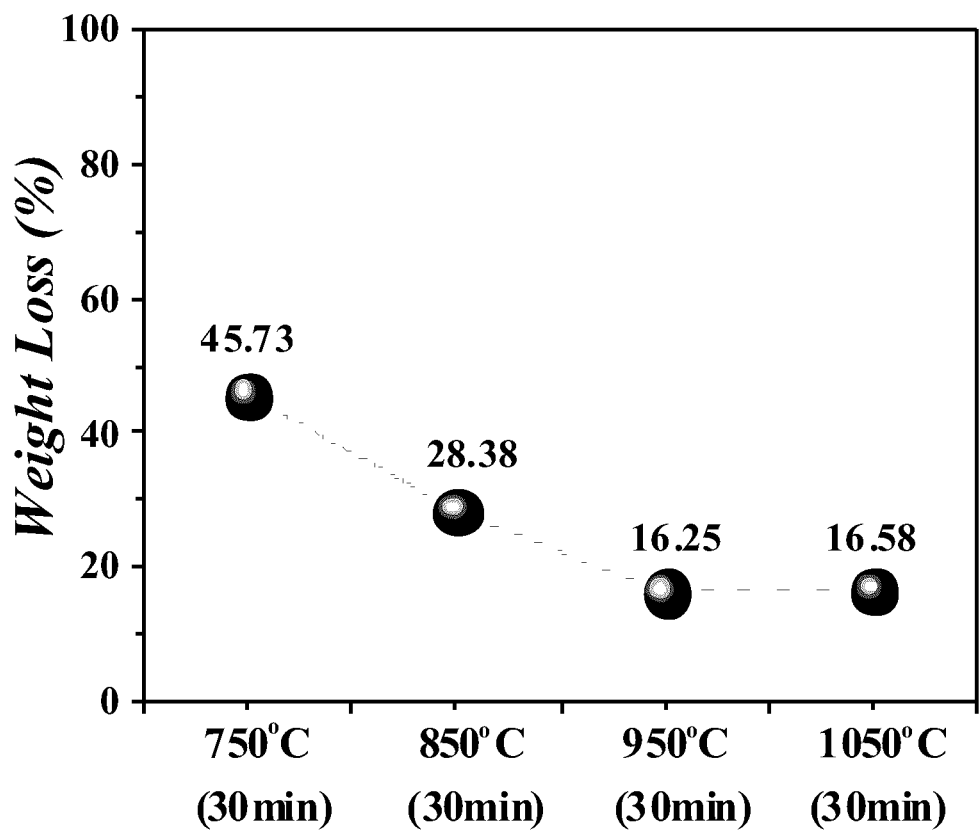
FIG. 4 is a graph showing the mass loss after 4 water washes from purified BNNT material that has been chlorine treated at various temperatures.
Figure 5A:
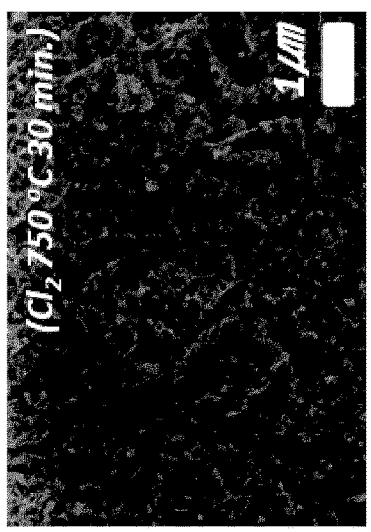
FIG. 5A to FIG. 5E are scanning electron micrographs of purified BNNT materials that have been chlorine treated at various temperatures and durations.
Figure 5B:
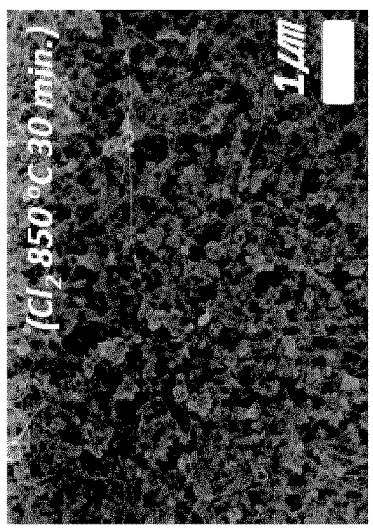
Figure 5C:
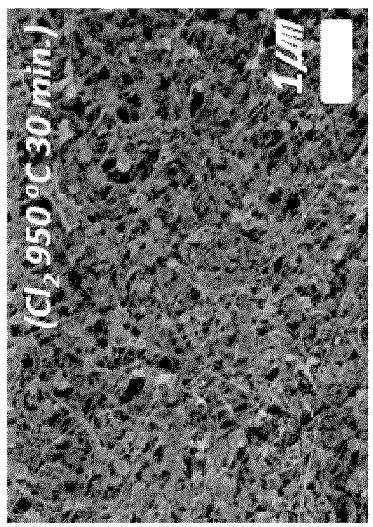
Figure 5D:
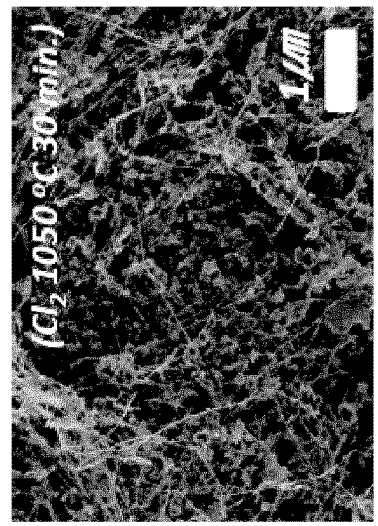
Figure 5E:
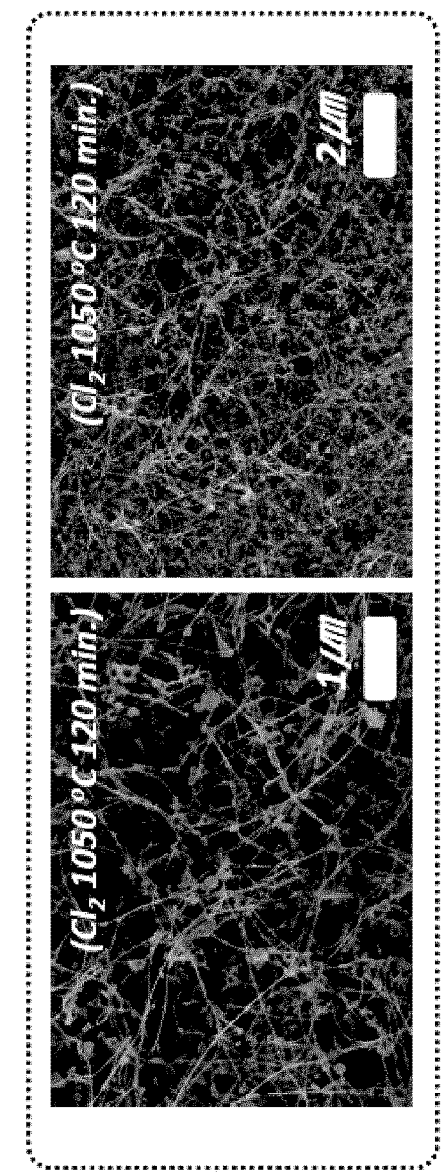

The experiments in this example follow a procedure similar to that described in Example 2, except that chlorine gas is inserted only when the final desired temperature is reached. Chlorine gas is then flowed at a rate of 1000 sccm for a prescribed 30 minutes. Two samples were treated at T=1050° C., one for a prescribed 30 minutes and another for a prescribed 120 minutes. Afterwards the experiments were terminated and material collected as described in Example 2. A 52 g sample of AP-BNNT material was homogenized and split into 4 samples of 12 g and 2 samples of 2 g. Each 12 g sample was purified for 30 minutes at a different temperature: 750° C., 850° C., 950° C. or 1050° C. A 2 g sample was purified at 1050° C. for 120 minutes. The other 2 g sample was left for comparison. After collection, the purified samples were subjected to various analyses. FIG. 3 shows the mass loss as a function of temperature and exposure time for T=1050° C. It is clear that the mass loss increases as the temperature increases and tends to plateau with longer exposure time at 1050° C. FIG. 4 shows the mass loss as a function of temperature following water washes using the protocol described in example 1 for gravimetric analyses. Here two grams of chlorine treated material was used per analysis. The wash process was repeated 4 times, after which the solution remained transparent after sonication. The filtrand was then dried and weighed. SEM analyses showed that the filtrate is essentially residual h-BN derivatives. Hence, the mass loss seen in FIG. 4 is associated with the removal of h-BN. It is clear that, as the processing temperature is increased, the amount of h-BN derivatives passing through the filter decreases, an indication that h-BN derivatives in the AP-BNNT is removed by chlorine as the temperature increases. These results seem to align with thermodynamics proposed and other observations regarding the selective etching of h-BN by molecular chlorine gas[10] This hypothesis is also validated by SEM analyses. FIG. 5A to FIG. 5E show field-emission SEM of BNNT after treatments at various temperatures. It is clear that the relative amount of BNNT increases as the temperature increases, and at longer exposure time for a given temperature (here 1050° C., as shown in FIG. 5E).

The purity of BNNTs can be determined by spectrometry using rra-P3HT. Martinez-Rubi et al.[7, 8] showed that rra-P3HT interacts specifically with BNNT, and not with h-BN, through π-π stacking. This interaction forces the rra-P3HT to align along the length of the BNNT, leading to a change in the color of the solution. Whereas rra-P3HT in chloroform is orange, once aligned on BNNT, the solution turns purple. The changes can be followed with precision using absorption spectroscopy. The absorption band of free rra-P3HT peaks at 432 nm whereas the absorption bands of the BNNT/rra-P3HT complex occur at 520, 555 and 603 nm. Martinez-Rubi et al., further demonstrated that the absorption intensity is related to the concentration of BNNT present in the sample.

Figure 6:
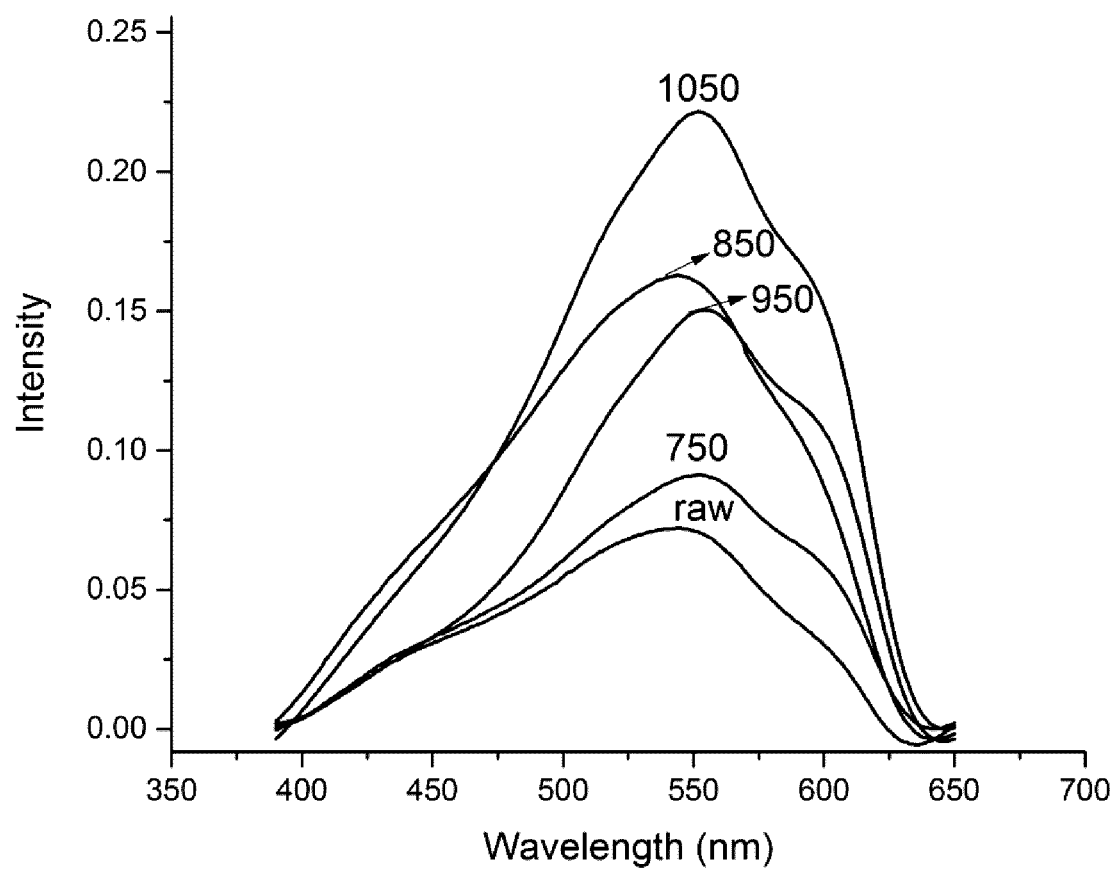
FIG. 6 is a graph showing absorption by P3HT/BNNT complexes of as produced BNNT and purified BNNT materials that were produced by chlorine treatment at various temperatures.

Taking advantage of this approach, the purity of the purified BNNT samples was determined by spectrometry using rra-P3HT. FIG. 6 shows the results for purified BNNT samples purified at various temperatures and provides a comparison with the AP-BNNT ("raw") prior to chlorine treatments. It is clear from these spectra that the purity of the samples increases as the temperature increases. There is a significant difference in the intensity (more accurately the area under the curve) of the bands, which increases with temperature. Moreover, the structure of the absorption band becomes more defined as the temperature increases, with the sample at 1050° C. exhibiting a typical well resolved band structure and a small shift to the higher wavelength, an indication of increased crystallinity. These results indicate an increase in purity and crystallinity of the BNNT samples with increased purification temperature. Without wishing to be bound by theory, we speculate that chlorine gas reacts with a defective BNNT surface more rapidly than it does with a structurally pristine BNNT surface. Once the defective surface is etched away, the structurally pristine surface remains intact for a length of time sufficient to yield pure BNNT. It is well known in the field of carbon and boron nitride nanotubes that defects exist on the surface of nanotubes. For BNNT, these defects could be B or N vacancies, which for B vacancies could be terminated with —O— bridges. The improvement in quality of the BNNT with increasing exposure time is observable by SEM analyses as shown in FIG. 5A to FIG. 5E.

Example 4—Purification Process: Effect of Longer Exposure Time

Figure 7:
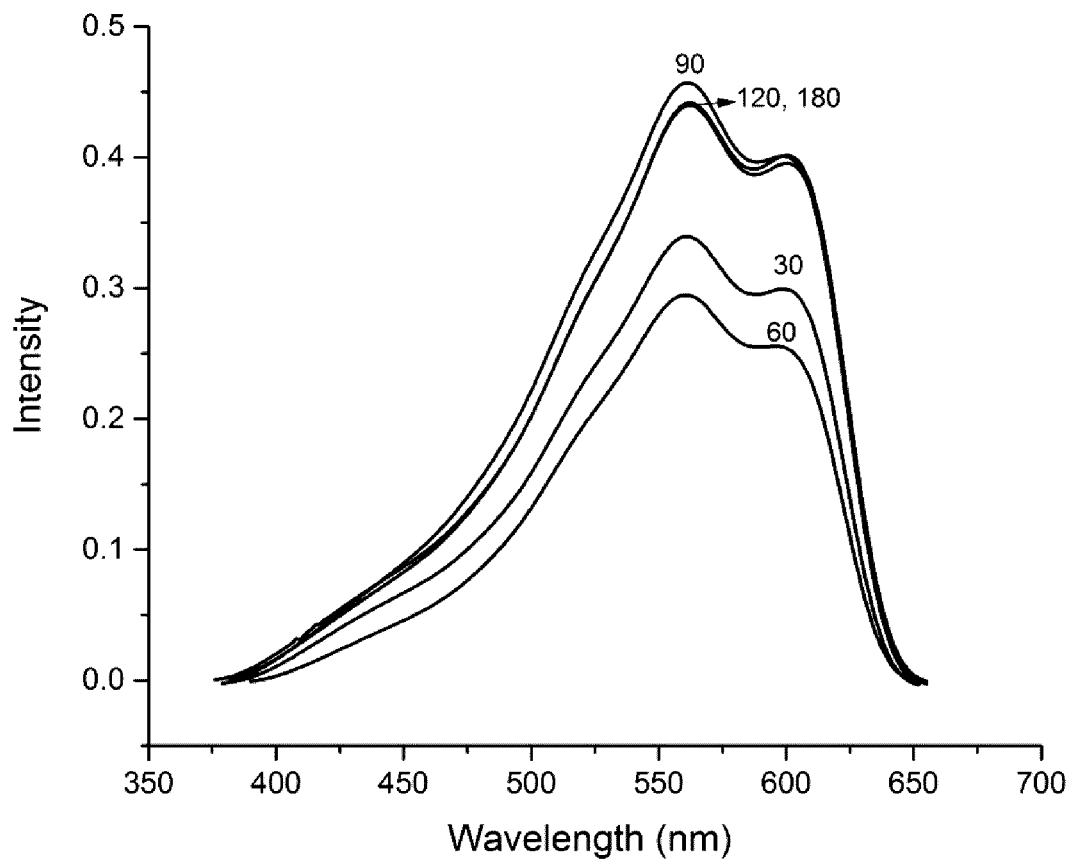
FIG. 7 is graph showing absorption by P3HT/BNNT complexes of purified BNNT materials that were produced by chlorine treatment at 1050° C. for various durations.

In another series of experiments carried out as described in Example 3, five 10 g samples were prepared from an homogenous batch and subjected to chlorine treatments at 1050° C., but with different exposure times of 30, 60, 90, 120 and 180 minutes. FIG. 7 shows the resulting absorption spectra for the BNNT/rrP3HT complex. It is clear that the purity increases with longer exposure time, but a plateau is reached after some time, here at 90 minutes at 1050° C. The effect of longer exposure time is also apparent from the SEM shown in FIG. 5A to FIG. 5E and from the mass loss shown in FIG. 3.

Example 5—Purification Process Using Bromine Gas

Figure 9:
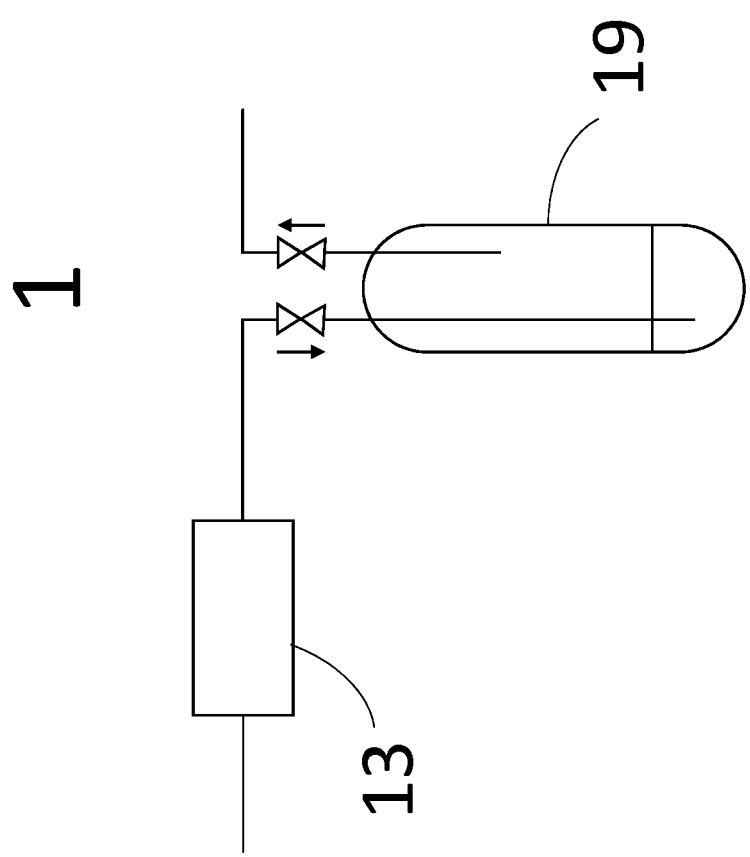
FIG. 9 is a schematic representation of a modification to the system of FIG. 1 configured for the use of Br as a halogen gas used to purify BNNT material.
Figure 11A:
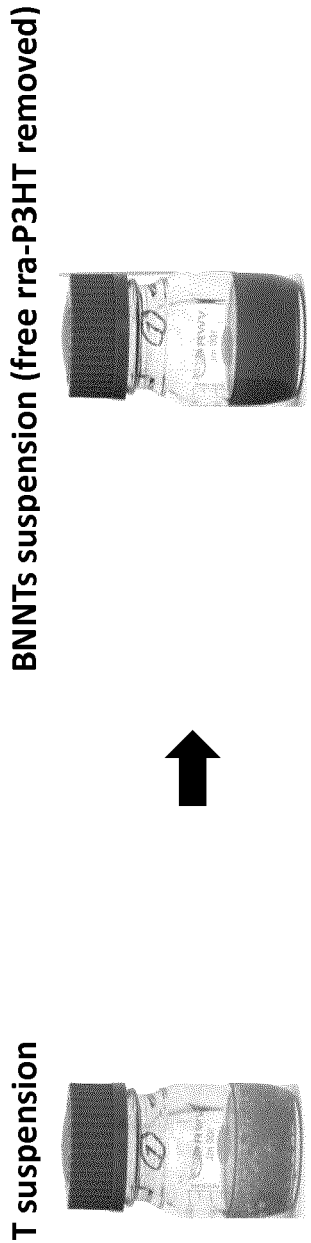
FIGS. 11A and 11B are images of samples of as produced (raw) and purified BNNT material processed according to the present disclosure. More particularly, FIG. 11A consists of photo images of the AP-BNNT material suspension before and after removing the residual (free) rra-P3HT.
Figure 11B:
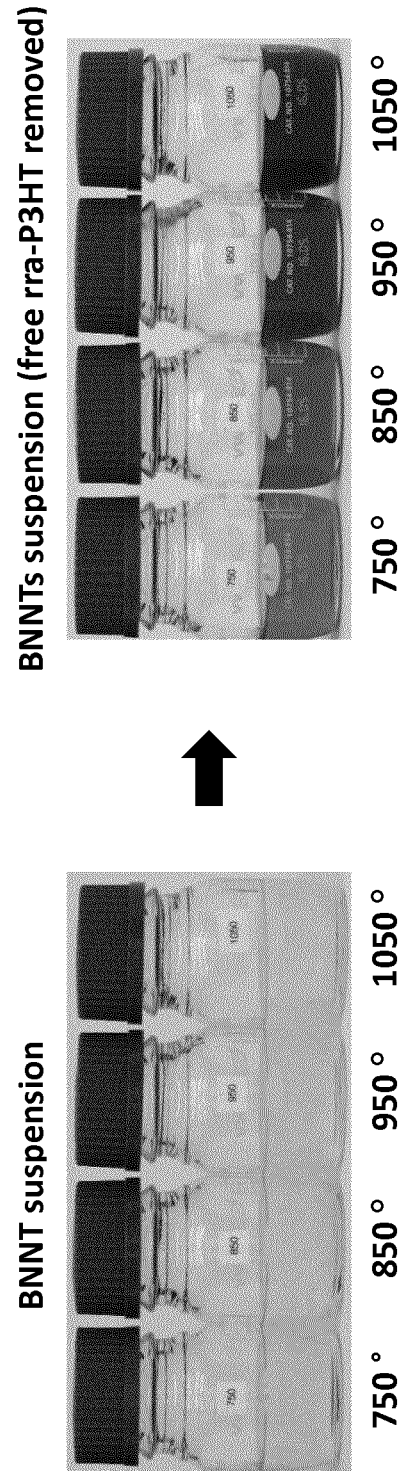
Figure 12A:
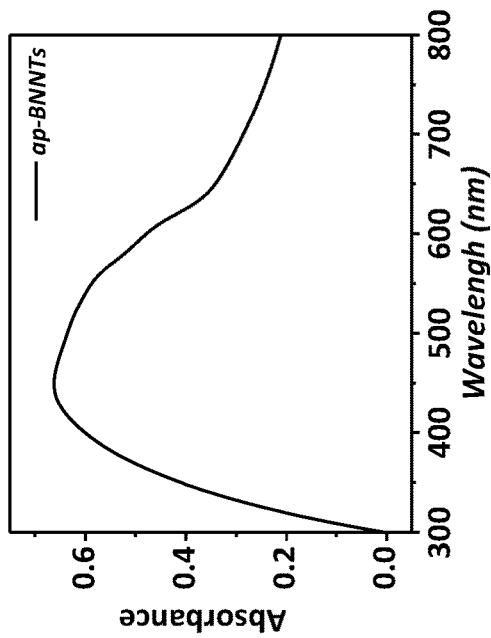
FIGS. 12A-12D are UV-vis absorption spectra with background profiles for BNNT material. More particularly.
Figure 12B:
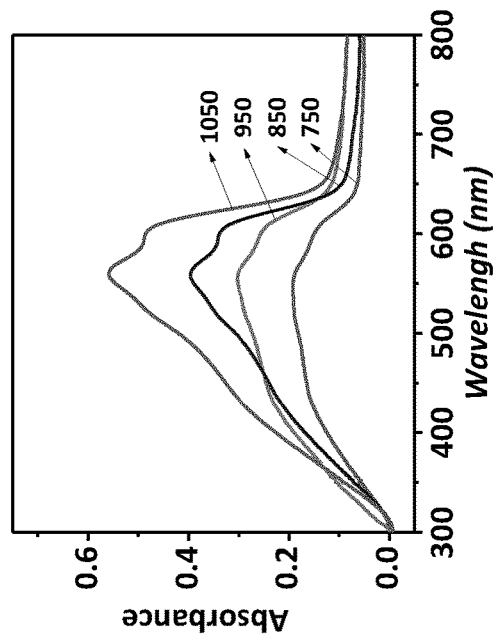
Figure 12C:
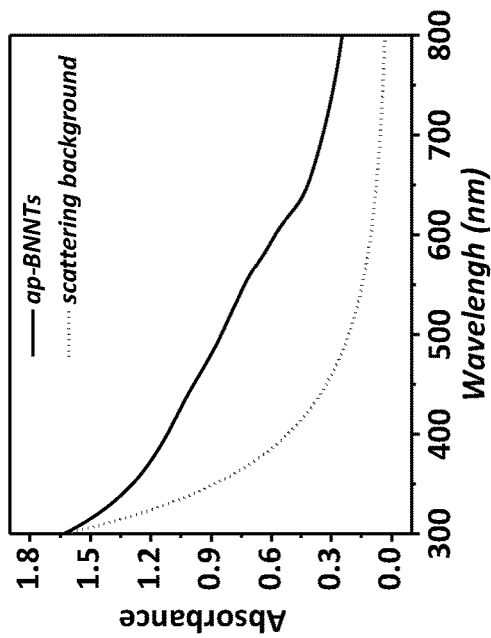
Figure 12D:
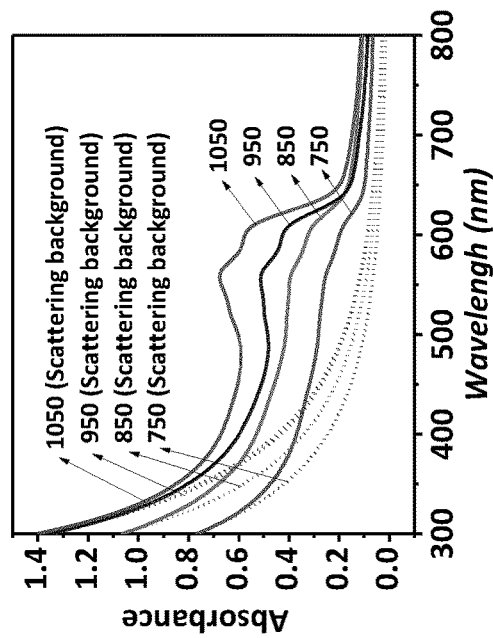

Bromine is liquid at room temperature but has a vapor pressure of about 200 Torrs. The apparatus shown in FIG. 1 needs to be modified to include a bromine reservoir 19 in which a carrier gas (Ar) can entrain the bromine vapor into the reactor as shown schematically in FIG. 9. A mass flow controller (see 13 in FIG. 9) is inserted before the reservoir 19 to control the flow rate of Ar and the gas line exiting the reservoir 19 is joined with line 8 of FIG. 1. Ten grams of AP-BNNT was weighted using an analytic balance and placed on the porous frit of the quartz tube (see 4 of FIG. 1). Subsequently, the purification procedure proceeded as in Example 2 with the following specifications. After confirming there is no gas leak, the temperature of the furnace was increased to 950° C. under 1000 sccm of Ar. When the temperature of the furnace was at 950° C., the $Ar/Br_2$ gas mixture was introduced into the quartz tube. The total flow rate was maintained to 1000 sccm while slowly transitioning from pure Ar to the $Ar/Br_2$ mixture. The process was conducted for 10 hours. When the purification was completed, the gas flow was transitioned to pure Ar and the furnace was cooled down. FIG. 10 shows photo images of the material before and after applying the purification process. The purification result is empirically evident from these images and the yield of the purification using $Br_2$ was approximately 42%, similar to the case with chlorine at 950° C.

The purification with bromine takes longer than with chlorine because as mentioned before the reactions rates are slower and the maximum concentration of bromine is limited to 200 Torrs at room temperature. Anyone skilled in the art can appreciate the possibility of using a mixture of chlorine and bromine by substituting Ar with chlorine gas. This offers further elements of controls in the purification process.

Example 6—Assessment of Quality of Purified BNNT Material

The examples provided above demonstrate that the process described herein appears to be able to purify BNNT materials in three ways:
1) the process removes elemental boron derivatives and BNH polymer residues when the halogen gas is chlorine and the temperature is in the range of about 400° C. to about 750° C.;
2) the process removes h-BN derivatives when the halogen gas includes chlorine and the temperature is in the range of about 850° C. to about 1250° C.; and
3) the process removes defective BNNT layers when the halogen gas is chlorine and the temperature is in the range of about 850° C. to about 1250° C.

Thus, it would be evident to a person skilled in the art that the process presented herein offers ways to purify BNNT materials at various purification levels and yields by selecting the temperature range and exposure time using a given halogen gas, with the option to mix halogen gases and/or add in other purifying agents, such as HCl. To demonstrate how the quality of purified BNNT material can be assessed, AP-BNNT material was purified according to the process of the present disclosure. FIGS. 11A-11B, 12A-12D and 13 are provided in accordance with the methods and quality index described by Y. Martinez Rubi et al.[7, 8]. The quality index applied is defined as the ratio ($Q_i$) of absorbance (I) in the low energy region measured at the maximum of the $A_{1-0}$ band and the high energy region measured at the 420 nm. Absorbance at the low and the high energy regions measures the amount of ordered and amorphous rra-P3HT aggregates respectively. With reference to FIG. 13 the processing of AP-BNNT material at increasing temperatures yields higher rra-P3HT quality index values, which are indicative of increasingly pure and crystalline (pristine) BNNT material.

References: The contents of the entirety of each of which are incorporated by this reference.

[1] K. S. Kim, M. J. Kim, C. Park, C. C. Fay, S. H. Chu, C. T. Kingston, B. Simard, *Semicond. Sci. Technol.* 2017, 32, 013003.

[2] D. Kim, H. Muramatsu, Y. A. Kim, *Nanoscale Res. Lett.* 2017, 12, 94.

[3] C. Y. Zhi, Y. Bando, T. Terao, C. C. Tang, H. Kuwahara, D. Golberg, *Chemistry—An Asian Journal* 2009, 4(10), 1536.

[4] M. Adnan, D. M. Marincel, O. Kleinerman, S. H. Chu, C. Park, S. J. A. Hocker, C. Fay, S. Arepalli, Y. Talmon, M. Pasquali, *Nano Lett.* 2018, 18, 1615.

[5] T. G. Dushatinski, K. C. Jordan, M. W. Smith, J. C. Stevens, R. Roy (BNNT LLC), PCT/US2017/016250, 2017.

[6] H. Chen, Y. Chen, J. Yu and J. S. Williams, *Chem. Phys. Lett.*, 2006, 425, 315.

[7] Y. Martinez-Rubi, Z. J. Jakubek, M. Chen, S. Zou and B. Simard, *ACS Appl Nano Mater* 2019, 2, 2054.

[8] Y. Martinez-Rubi, Z. J. Jakubek, M. B. Jakubinek, K. S. Kim, F. Cheng, M. Couillard, C. Kingston and B. Simard, *J. Phys. Chem. C*, 2015, 119, 26605.

[9] H. Sachdev and M. Straub, *Diamond and Related Materials* 2000, 9, 614.

[10] A. Bartl, S. Bohr, R. Haubner and B. Lux, *Int. J. of Refractory Metals & Hard Materials*, 1996, 14, 145.

While various specific embodiments have been described above, it should be understood that those embodiments have been presented by way of example only and are not meant to limit the claims. The claims should instead be given the broadest interpretation consistent with the wording of the claims and the specification as a whole.

The invention claimed is:

1. A process for purifying boron nitride nanotubes, the process comprising:
    contacting a solid boron nitride nanotube (BNNT) material containing boron nitride nanotubes and impurities with a halogen gas selected from the group consisting of chlorine, bromine and fluorine at a temperature in a range of 600° C. to 1250° C. when chlorine is the halogen, 700° C. to 1250° C. when bromine is the halogen gas, and 500° C. to 700° C. when fluorine is the halogen gas, the impurities reacting with the halogen gas to produce gaseous halogen-containing byproducts; and,
    removing the gaseous halogen-containing byproducts and unreacted halogen gas from the solid boron nitride nanotube material to produce purified boron nitride nanotubes.

2. The process of claim 1 conducted under dry conditions.

3. The process of claim 1, wherein the impurities comprise boron-containing impurities.

4. The process of claim 1, wherein the purity and crystallinity of BNNT material recovered from the process improves as the temperature is increased up to a maximum temperature of 1250° C.

5. The process of claim 3, wherein the impurities removed comprise hexagonal boron nitride.

6. The process of claim 3, wherein the impurities removed comprise defective BNNT material.

7. The process of claim 1, wherein the gaseous halogen-containing byproducts comprise a boron trihalide.

8. The process of claim 1, wherein the solid boron nitride nanotube material is a material produced in a catalyst-free process.

9. The process of claim 1, wherein the gaseous halogen-containing byproducts and unreacted halogen gas are removed from the solid boron nitride nanotube material under a positive pressure of flowing gas.

10. The process of claim 1, wherein the purity of the purified boron nitride nanotubes is at least 75%.

11. The process of claim 1, wherein the solid boron nitride nanotube material is exposed to the halogen gas at the indicated temperature for a period of about 1-20 minutes per gram of solid boron nitride nanotube material.

\* \* \* \* \*

UNITED STATES PATENT AND TRADEMARK OFFICE
CERTIFICATE OF CORRECTION

| | | |
|---|---|---|
| PATENT NO. | : 12,172,889 B2 | Page 1 of 1 |
| APPLICATION NO. | : 17/253749 | |
| DATED | : December 24, 2024 | |
| INVENTOR(S) | : Simard et al. | |

It is certified that error appears in the above-identified patent and that said Letters Patent is hereby corrected as shown below:

On the Title Page

Item (72), Lines 9 and 10:
For inventor Denommee in the list of Inventors, 'Ottawa' should read -Gatineau-.
For inventor Ruth in the list of Inventors, 'Gatineau' should read -Orleans-.

Signed and Sealed this
Eleventh Day of February, 2025

Coke Morgan Stewart
*Acting Director of the United States Patent and Trademark Office*